(12) United States Patent
Yoneu

(10) Patent No.: US 7,269,404 B2
(45) Date of Patent: Sep. 11, 2007

(54) RADIO-FREQUENCY RECEIVING APPARATUS

(75) Inventor: Yuki Yoneu, Nara (JP)

(73) Assignee: Sharp Kabushiki Kaisha, Osaka-shi (JP)

(*) Notice: Subject to any disclaimer, the term of this patent is extended or adjusted under 35 U.S.C. 154(b) by 413 days.

(21) Appl. No.: 10/899,060

(22) Filed: Jul. 27, 2004

(65) Prior Publication Data
US 2005/0026579 A1 Feb. 3, 2005

(30) Foreign Application Priority Data
Jul. 28, 2003 (JP) ............... 2003-202362

(51) Int. Cl.
*H04B 17/00* (2006.01)
(52) U.S. Cl. ............... 455/403; 455/67.14; 455/115.2; 455/226.1
(58) Field of Classification Search .... 455/67.11–67.7, 455/115.1–115.4, 226.1–226.4
See application file for complete search history.

(56) References Cited
U.S. PATENT DOCUMENTS

| | | | |
|---|---|---|---|
| 5,835,850 A * | 11/1998 | Kumar | 455/67.14 |
| 6,088,581 A * | 7/2000 | Bickley et al. | 455/131 |
| 6,259,314 B1 * | 7/2001 | Liu et al. | 329/304 |
| 6,380,748 B1 | 4/2002 | Kang et al. | |
| 7,050,778 B1 * | 5/2006 | Olson | 455/296 |
| 2001/0046845 A1 * | 11/2001 | Schetelig et al. | 455/226.1 |
| 2005/0164648 A1 * | 7/2005 | Gannholm | 455/84 |

FOREIGN PATENT DOCUMENTS

| | | |
|---|---|---|
| JP | 57-20045 A | 2/1982 |
| JP | 2002-232498 A | 8/2002 |

* cited by examiner

*Primary Examiner*—Simon Nguyen
(74) *Attorney, Agent, or Firm*—Birch, Stewart, Kolasch & Birch, LLP

(57) ABSTRACT

The subject invention provides a radio-frequency receiving apparatus including a built-in test signal source for producing a radio-frequency test signal. This structure achieves cost reduction, as well as an increase of the yield, since an expensive test signal source is not required. Further, the built-in test signal source creates a test signal by using signals from a VCO and an oscillator, that are used for creating a local oscillation signal for frequency conversion. Thus, the test can be performed inside the integrated circuit with minimum increase of circuit scale.

11 Claims, 4 Drawing Sheets

RADIO-FREQUENCY RECEIVING APPARATUS

This Non provisional application claims priority under 35 U.S.C. § 119(a) on patent application Ser. No. 2003/202362 filed in Japan on Jul. 28, 2003, the entire contents of which are hereby incorporated by reference.

FIELD OF THE INVENTION

The present invention relates to a radio-frequency receiving apparatus, that is formed as an integrated circuit and performs frequency conversion upon receipt of an input radio-frequency signal, such as a digital television broadcast.

BACKGROUND OF THE INVENTION

A television broadcast receiving apparatus often adopts a method of mixing a local oscillation signal, that is created in a PLL or the like, with a received radio-frequency signal so as to perform frequency conversion so that the received signal is converted to an intermediate frequency signal or a base band signal. This manner offers relatively easy production of a base band signal.

FIG. 5 is a block diagram illustrating an electrical structure of a typical conventional radio-frequency receiving apparatus (hereinafter it may be simply referred to as a receiving apparatus) 1 performing such frequency conversion. The receiving apparatus 1 performs reception of digital television broadcasts. A radio-frequency signal (quadrature digital modulation signal) transmitted from a TV station is inputted to the receiving apparatus 1 via an input terminal 2. Then, the input radio-frequency signal is supplied to a gain-variable radio-frequency amplifier 3 to be amplified, before commonly supplied to two mixers 4 and 5. The separated two input radio-frequency signals supplied to the mixers 4 and 5 are respectively mixed with local oscillation signals of 0° and 90° phases, to be modulated to quadrature base band signals I and Q.

The base band signal outputted from the mixer 4 is amplified at a gain-variable base band amplifier 6. Then, a low-pass filter 7 extracts a frequency component of the desired band from the base band signal. Thereafter, the base band signal is further amplified at the amplifier 8 before outputted via a base band output terminal 9.

Similarly, the base band signal outputted from the mixer 5 is amplified at a gain-variable base band amplifier 10, and then a low-pass filter 11 extracts a frequency component of the desired band from the base band signal. Thereafter, the base band signal is further amplified at the amplifier 12 before outputted via a base band output terminal 13.

The receiving apparatus 1 includes a voltage-control-type local oscillator (VCO) 14, an oscillator 15, a PLL (Phase Lock Loop) circuit 16, and a 90° phase shifter 17. The local oscillation signal produced at the VCO 14 passes through the 90° phase shifter 17 to be supplied to one of the mixers 4 and 5. One of the mixers (the mixer 4 in FIG. 5) is supplied with a 0° component, i.e., an unmodified signal, and the other (the mixer 5 in FIG. 5) is supplied with a 90° component having been through phase shifting by the 90° phase shifter 17. In this way, the received radio-frequency signal is mixed with the local oscillation signal to be modulated to the quadrature base band signals I and Q.

In the VCO 14, the local oscillation signal is stabilized to a frequency corresponding to the receiving channel, by a feed-back control performed by the PLL circuit 16. More specifically, the PLL circuit 16 compares the phase of a reference signal and the phase of the local oscillation signal having been through frequency division by the VCO 14. Then, PLL circuit 16 smoothes an error output corresponding to the phase difference so as to produce a DC tuning voltage, that is supplied to the VCO 14. The reference signal has a stable and consistent frequency, and is outputted from the oscillator 15 that is made of, for example, a crystal oscillator.

The PLL circuit 16 is supplied with a signal having a frequency corresponding to the receiving channel from, for example, an external control microcomputer. The PLL circuit 16 varies a frequency division ratio of the local oscillation signal supplied form the VCO 14, according to the supplied signal having a frequency corresponding to the receiving channel, so that the VCO 14 outputs a local oscillation signal corresponding to the receiving signal.

In this example, the gain-variable radio-frequency amplifier 3, the mixers 4 and 5, the gain-variable base band amplifiers 6 and 10, the low-pass filters 7 and 11, the amplifiers 8 and 12, the VCO 14, the PLL circuit 16, the 90° phase shifter 17 etc. constitute a frequency conversion section for performing frequency conversion upon reception of an input radio-frequency signal.

As shown in FIG. 5, the radio-frequency apparatus 1 with the described structure is subjected to delivery inspection, using a test signal transmission device 18 and a testing device 19. The test signal transmission device 18 transmits a test signal to the receiving apparatus 1 instead of the radio-frequency signal from the antenna. The test signal is supplied to the receiving apparatus 1 via the input terminal 2. The testing device 19 screens out inferior products by detecting the quadrature base band signals I and Q in terms of signal level, frequency, phase etc. and finding out whether the level of each factor is within a stipulated value.

More specifically, the following describes the case of a gain-balance test that performs an examination for finding out whether or not the output level difference of the quadrature base band signals I and Q is within a predetermined range. In this case, the test signal transmission device 18 transmits a test signal having a specific frequency; and the testing device 19 detects the signal level of the quadrature base band signals I and Q, and examines whether or not the detected level difference is within the stipulated value.

Further, in the case of a phase-difference test that performs an examination for finding out whether or not the phase difference of the quadrature base band signals I and Q is within a predetermined range, the test signal radio-frequency receiving apparatus only by externally adding some of the components. In the foregoing publication Japanese Laid-Open Patent Application Tokukai 2002-232498, that is an example of such a single chip structure, the modulation circuit (digital circuit) includes testing means, and the test is performed by supplying a sin signal via the input terminal, instead of a receiving signal.

However, in the actual wafer test, it is difficult to input a radio-frequency signal to an integrated circuit in the form of a single chip, thereby allowing the inferior chips to be carried for further processing. Further, as also disclosed in the foregoing publication Japanese Laid-Open Patent Application Tokukai 2002-232498, there has been development of a multi-chip structure in which the chip of the radio-frequency receiving apparatus is contained in a package together with a base band processing circuit etc. In this case, if an inferior chip is subjected to further processing, the whole package containing the inferior chip becomes an inferior product. For this reason, the examination at a stage of wafer state is beneficial in this structure.

SUMMARY OF THE INVENTION

An embodiment of the present invention provides a radio-frequency receiving apparatus that is capable of input examination of a high-frequency test signal at a wafer test.

More specifically, a radio-frequency receiving apparatus of an embodiment of the present invention performs frequency conversion with a frequency conversion section upon receipt of an input radio-frequency signal. The apparatus comprises a test signal source for producing a radio-frequency test signal, wherein: the test signal source produces the radio-frequency test signal by using a local oscillation signal that is created for the frequency conversion by a built-in oscillation circuit that is included in the frequency conversion section.

With this arrangement, the conventional difficulties of input examination of the high frequency test signal can be overcome with a built-in test signal source. Therefore, this structure is useful for a recent circuit chip used for receiving a radio-frequency signal, that is often arranged as a multi-chip in which a plurality of chips are contained in a single package. This is because such a structure particularly requires the examination at a stage of a wafer state.

Therefore, the foregoing arrangement achieves cost reduction, as well as an increase of the yield, since the expensive test signal source is not required. Further, the built-in test signal source creates a test signal by using signals from a so-called built-in oscillation circuit such as transmission device 18 transmits a test signal having a specific level; and the testing device 19 detects the phase of the quadrature base band signals I and Q, and examines whether or not the detected phase difference is within the stipulated value.

However, the test signal transmission device 18 and the testing device 19 are expensive; for example, s single device can be several millions yen or can even be several ten millions yen. Therefore, equipment of the test devices can increase the unit cost of the radio-frequency receiving apparatus.

Under such a circumstance, the applicant of the present invention made an invention, that has been published as Japanese Laid-Open Patent Application Tokukai 2002-232498 (published on Aug. 16, 2002). This reference teaches a structure using an A/D mixed chip in which an RF circuit and a base band circuit are unified as a single chip. In this structure, the analog circuit is examined by using an output of the A/D conversion. In this manner, the expensive measurement device or testing terminal can be omitted.

As a typical radio-frequency apparatus, a tuner has been known; however, due to recent development of an integrated circuit, all major components are unified as a single chip, and an existing apparatus may be used as a a VCO, that are indispensable circuits for a receiving apparatus performing frequency conversion. Thus, the test can be performed inside the integrated circuit with minimum increase of circuit scale.

Additional, features and strengths of the embodiments of the present invention will be made clear by the description below. Further advantages will be evident from the following explanation in reference to the drawings.

DESCRIPTION OF THE EMBODIMENTS

One Embodiment of the present invention is described below with reference to FIGS. 1 through 3.

Figure 1:
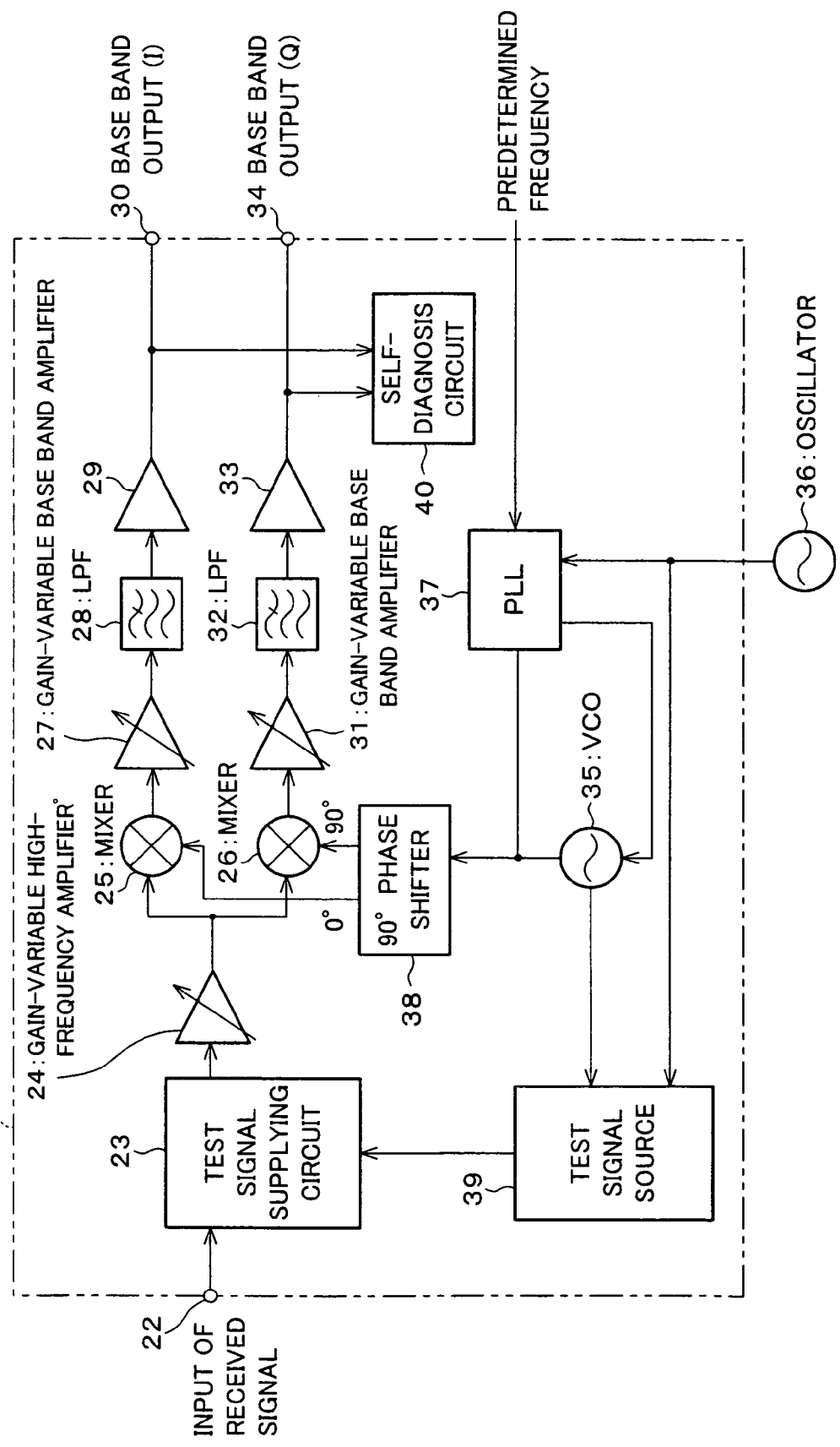
FIG. 1 is a block diagram illustrating an electrical structure of a radio-frequency receiving apparatus according to one embodiment of the present invention.

FIG. 1 is a block diagram illustrating an electrical structure of a radio-frequency receiving apparatus (hereinafter it may be simply referred to as a receiving apparatus) 21 according to one embodiment of the present invention. The receiving apparatus 21 is to receive digital television broadcasts. A radio-frequency signal (quadrature digital modulation signal) transmitted from a TV station is inputted to the receiving apparatus 21 via an input terminal 22. Then, the input radio-frequency signal is supplied to a gain-variable radio-frequency amplifier 24 to be amplified, through a test signal supplying circuit (described later) 23, before commonly supplied to two mixers 25 and 26. The separated two input radio-frequency signals supplied to the mixer 25 are 26 are respectively mixed with local oscillation signals of 0° and 90° phases, to be modulated to quadrature base band signals I and Q.

The base band signal outputted from the mixer 25 is amplified at a gain-variable base band amplifier 27. Then, a low-pass filter 28 extracts a frequency component of the desired band from the base band signal. Thereafter, the base band signal is further amplified at the amplifier 29 before outputted via a base band output terminal 30.

Similarly, the base band signal outputted from the mixer 26 is amplified at a gain-variable base band amplifier 31, and then a low-pass filter 32 extracts a frequency component of the desired band from the base band signal. Thereafter, the base band signal is further amplified at the amplifier 33 before outputted via a base band output terminal 34.

The receiving apparatus 21 includes a voltage-control-type local oscillator (VCO) 35, an oscillator 36, a PLL (Phase Lock Loop) circuit 27, and a 90° phase shifter 38. The local oscillation signal produced at the VCO 35 passes through the 90° phase shifter 38 to be supplied to one of the mixers 25 and 26. One of the mixers (the mixer 25 in FIG. 1) is supplied with a 0° component, i.e., an unmodified signal, and the other (the mixer 26 in FIG. 1) is supplied with a 90° component having been through phase shifting by the 90° phase shifter 38. In this way, the received radio-frequency signal is mixed with the local oscillation signal to be modulated to the quadrature base band signals I and Q.

In the VCO 35, the local oscillation signal is stabilized to a frequency corresponding to the receiving channel, by a feed-back control performed by the PLL circuit 37. More specifically, the PLL circuit 37 compares the phase of a reference signal and the phase of the local oscillation signal having been through frequency division by the VCO 35. Then, PLL circuit 37 smoothes an error output corresponding to the phase difference so as to produce a DC tuning voltage, that is supplied to the VCO 35. The reference signal has a stable and consistent frequency and is outputted from the oscillator 36 that is made of, for example, a crystal oscillator.

The PLL circuit 37 is supplied with a signal having a frequency corresponding to the receiving channel from, for example, an external control microcomputer. The PLL circuit 37 varies a frequency division ratio of the local oscillation signal supplied form the VCO 35, according to the supplied signal having a frequency corresponding to the receiving channel, so that the VCO 35 outputs a local oscillation signal corresponding to the receiving signal.

In this embodiment, the gain-variable radio-frequency amplifier 24, the mixers 25 and 26, the gain-variable base band amplifiers 27 and 31, the low-pass filters 28 and 32, the amplifiers 29 and 33, the VCO 35, the PLL circuit 37, the 90° phase shifter 38 etc. constitute a frequency conversion section for performing frequency conversion upon reception of an input radio-frequency signal.

Figure 5:
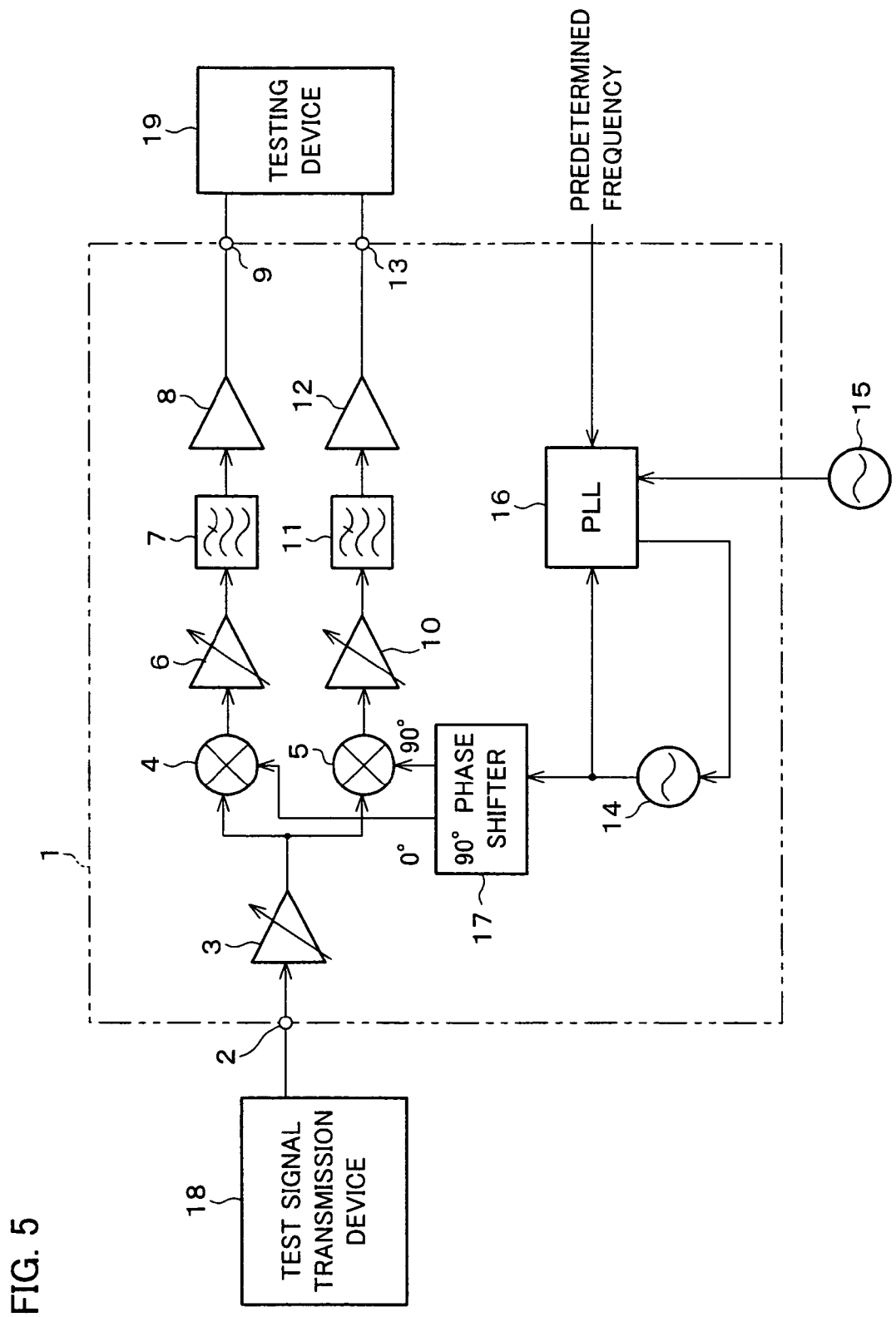
FIG. 5 is a block diagram illustrating an electrical structure of a typical conventional radio-frequency receiving apparatus.

The structure is so far similar to the radio-frequency receiving apparatus 1 shown in FIG. 5. However, as a notable difference, the radio-frequency receiving apparatus 21, that is formed as an integrated circuit, further includes the test signal supplying circuit 23, a test signal source 39, and a self-diagnosis circuit 40.

Figure 2:
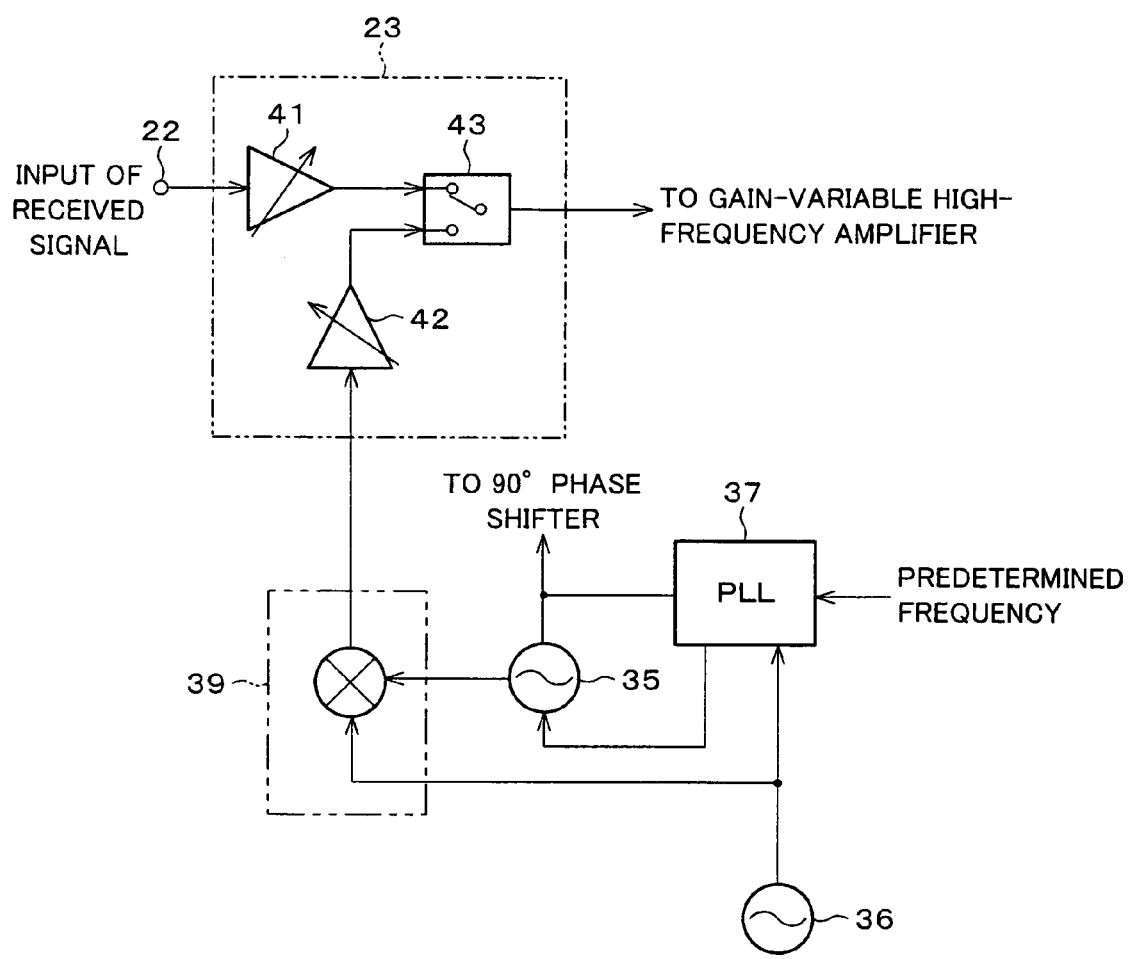
FIG. 2 is a block diagram illustrating a structure example of a test signal supplying circuit of the radio-frequency receiving apparatus shown in FIG. 1.

As shown in FIG. 2, the test signal source 39, made of a mixer circuit, mixes the local oscillation signal supplied from the VCO 35 and the reference signal supplied from the oscillator 36, and further modulates the mixed signal to produce a test signal, that is used for a test for examining the radio-frequency receiving apparatus 21. In this arrangement, it is possible to realize the test signal source 39 only by adding the mixer circuit to an existing structure (the VCO 35, the oscillator 36 and the PLL circuit 37) for producing a local oscillation signal used for frequency conversion, thereby reducing the circuit scale.

The test signal supplying circuit 23 selectively supplies one of the input radio-frequency signal and a test signal to the gain-variable radio-frequency amplifiers 24. In normal receiving operation, the test signal supplying circuit 23 supplies the input radio-frequency signal inputted through the input terminal 22. Meanwhile, in test operation, the test signal supplying circuit 23 supplies the test signal produced by the test signal source 39. Specifically, as shown in FIG. 2, the test signal supplying circuit 23 includes gain-switching amplifiers 41 and 42 and a switch 43. The gain-switching amplifiers 41 and 42 are respectively provided on the signal line for the input radio-frequency signal, and the signal line for the test signal. The switch 43 carries out switching operation to select one of the outputs of the gain-switching amplifiers 41 and 42.

In the gain-switching amplifiers 41 and 42, gains are switched by the external control microcomputer etc., so as to use different gains for the normal operation and for the test operation. More specifically, the gain-switching amplifier 41, that amplifies the input radio-frequency signal, uses a low gain in the test operation and uses a high gain in the normal operation. With this setting, it is possible to carry out the test without influence of leakage of an external radio-frequency signal.

Further, the gain-switching amplifier 42, that amplifies the test signal, uses a high gain in the test operation and uses a low gain in the normal operation. With this setting, influence of leakage of a test signal can be prevented, thereby ensuring the reproduction characteristics during the normal operation.

Meanwhile, the self-diagnosis circuit 40 is supplied with the base band signals I and Q respectively outputted from the amplifiers 29 and 33, and carried out self-diagnosis of the characteristics of the radio-frequency receiving apparatus 21. With this structure, it is possible to omit a conventionally required testing device for carrying out a test.

Figure 3:
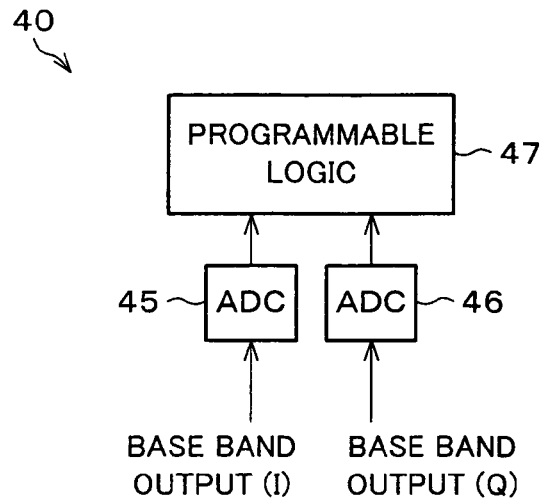
FIG. 3 is a block diagram illustrating a structure example of a self-diagnosis circuit of the radio-frequency receiving apparatus shown in FIG. 1.

FIG. 3 is a block diagram illustrating an arrangement of the self-diagnosis circuit 40. The self-diagnosis circuit 40 is made up of AD converters 45 and 46 and a programmable logic 47.

The AD converters 45 and 46 convert the base band signals I and Q, that are analog signals produced by the test signals through frequency conversion, into digital signals. The programmable logic 47 carries out a predetermined processing with respect to the base band signals I and Q thus converted from the analog signals to the digital signals with a programmed circuit, so as to carry out Acceptance/Rejection judgment for each test factor. In this structure, the setting of the Acceptance/Rejection judgment, i.e., judgment standard may be easily changed by re-programming the circuit, thereby carrying out the test with more flexible specs etc.

With the foregoing arrangement of mounting the test signal source 39 and the test signal supplying circuit 23 to the radio-frequency receiving apparatus 21 formed as an integrated circuit, it becomes possible to perform the input examination of a radio-frequency test signal during the wafer test, that has conventionally been stuck by some difficulties. Therefore, the foregoing arrangement achieves cost reduction, as well as an increase of the yield, since the expensive test signal source is not required. Further, the built-in test signal source creates a test signal by using signals from the VCO 35 and the oscillators 36, that are indispensable circuits for a receiving apparatus performing frequency conversion. Thus, the test can be performed inside the integrated circuit with minimum increase of circuit scale.

Note that, as described, an embodiment of the present invention allows omission of an expensive test signal source or a testing device; however, the chip area will be increased by mounting of the test signal source 39, the test signal supplying circuit 23 and the self-diagnosis circuit 40. Accordingly, an embodiment of the present invention is particularly suitable for testing of small-lot production or inefficient production, in terms of its easy estimation in the wafer state and cost reduction due to omission of the external devices. On the contrary, large-lot production may prefer a conventional test system since the profit will recover the cost of the test signal source and the testing device. However, in the case of creating various types of chip by such large-lot production, there may be some difficulties in ensuring equipment of the testing source and device and the areas thereof, while maintaining desirable mass production. In this view, an embodiment of the present invention allowing omission of those devices is still useful for such large-lot production.

The self-diagnosis circuit 40 may be provided in an arbitrary portion; however, as with the case of FIG. 1, it is preferably set in the final stage in which the frequency becomes lowest, in consideration of signal degradation due to leading of wiring, or of the sampling frequency of AD conversion.

Another embodiment of the present invention is described below with reference to FIG. 4.

Figure 4:
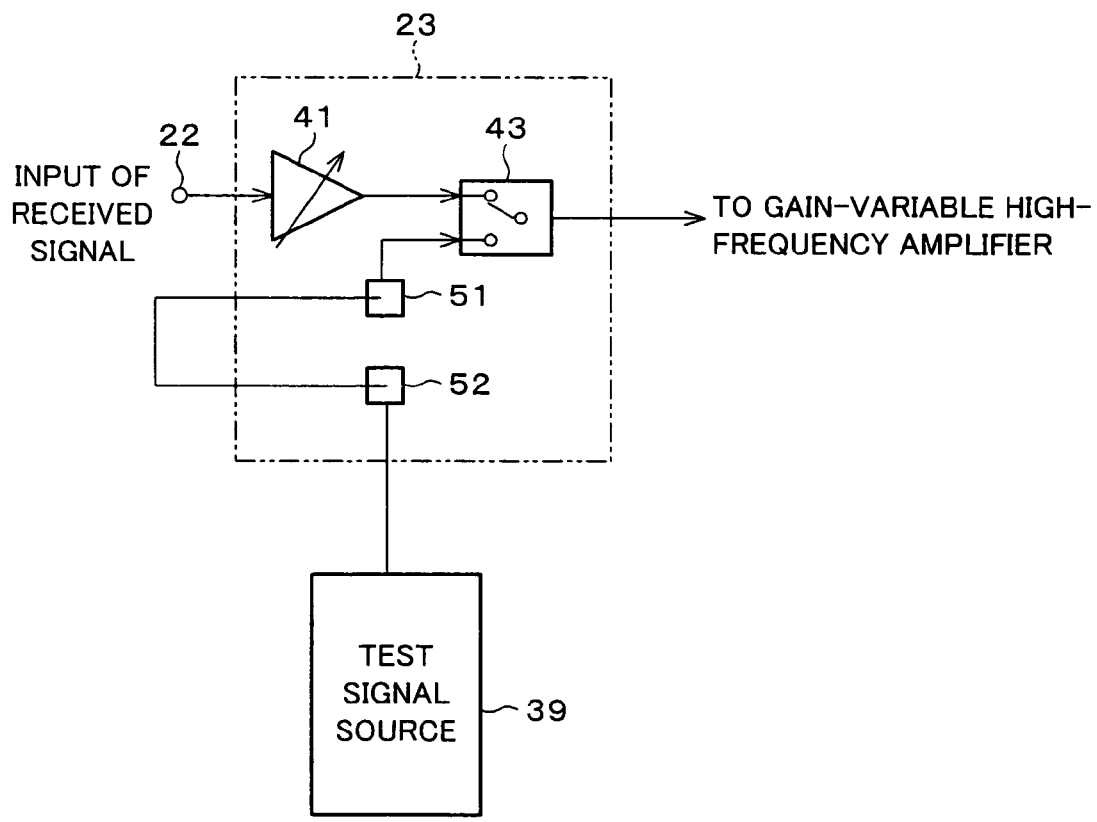
FIG. 4 is a block diagram illustrating an electrical structure of a test signal supplying circuit of a radio-frequency receiving apparatus according to another embodiment of the present invention.

FIG. 4 is a block diagram illustrating an electrical structure of a test signal supplying circuit 23*a* provided in a radio-frequency receiving apparatus according to another embodiment of the present invention. The high frequency receiving apparatus of the present embodiment differs from the radio-frequency receiving apparatus 21 of the previous embodiment in that the test signal supplying circuit 23 is replaced with the test signal supplying circuit 23a.

As with the test signal supplying circuit 23, the test signal supplying circuit 23a includes a gain-switching amplifier 41 and a switch 43, and has a cut-off test signal line with ends having short-circuit pads 51 and 52. The short-circuit pads 51 and 52 are conducted (short-circuited) in test operation to open a path for the test signal, and are released from the-conduction in normal operation to block the path for the test signal.

With this setting, influence of leakage of a test signal can be prevented, thereby ensuring the reproduction characteristics during the normal operation.

A radio-frequency receiving apparatus according to an embodiment of the present invention is formed as an integrated circuit, and performs frequency conversion with a frequency conversion section upon receipt of an input radio-frequency signal. The apparatus comprises a test signal source for producing a radio-frequency test signal, wherein: the test signal source produces the radio-frequency test signal by using a local oscillation signal that is created for the frequency conversion by a built-in oscillation circuit that is included in the frequency conversion section.

With this arrangement of an embodiment of the present invention, the conventional difficulties of input examination of the high frequency test signal can be overcome with a built-in test signal source. Therefore, this structure is useful for a recent circuit chip used for receiving a radio-frequency signal, that is often arranged as a multi-chip in which a plurality of chips are contained in a single package. This is because such a structure particularly requires the examination at a stage of a wafer state.

Therefore, the foregoing arrangement achieves cost reduction, as well as an increase of the yield, since the expensive test signal source is not required. Further, the built-in test signal source creates a test signal by using signals from a so-called built-in oscillation circuit such as a VCO, that are indispensable circuits for a receiving apparatus performing frequency conversion. Thus, the test can be performed inside the integrated circuit with minimum increase of circuit scale.

Further, the radio-frequency receiving apparatus of an embodiment of the present invention further comprises a self-diagnosis circuit for judging an output signal of the frequency conversion section where the test signal produced in the test signal source is subjected to frequency conversion.

With this arrangement additionally including self-diagnosis circuit, the device carries out diagnosis of its own characteristics by using a test signal from the built-in test signal source.

This arrangement does not require a testing device that has been conventionally required for the examination.

Further, the radio-frequency receiving apparatus of an embodiment of the present invention is arranged so that the self-diagnosis circuit includes an AD converter for performing analog/digital conversion with respect to an output signal of the frequency conversion section where the test signal is subjected to frequency conversion; and a programmable logic for processing an output signal of the AD converter using a programmable signal processing program.

With this arrangement, the AD converter converts such as the base band signal, that is an analog signal produced by the test signal through frequency conversion, into a digital signal. Meanwhile, the programmable logic carries out a predetermined processing with respect to the base band signal thus converted from the analog signal to the digital signal with a programmed circuit, so as to carry out Acceptance/Rejection judgment for each test factor. In this structure in which the programmable logic carries out a predetermined processing with respect to the base band signal etc. with a programmed circuit, so as to carry out Acceptance/Rejection judgment for each test factor, the setting of the Acceptance/Rejection judgment, i.e., judgment standard may be easily changed by re-programming the circuit, thereby carrying out the test with more flexible specs etc.

Further, the radio-frequency receiving apparatus of an embodiment of the present invention is arranged so that the test signal source is a testing mixer circuit, that produces the radio-frequency test signal by using the local oscillation signal created by the built-in oscillation circuit and a reference signal supplied from an external oscillation circuit, the reference signal being used for control of the local oscillation signal, performed by a phase lock loop circuit included in the frequency conversion section.

With this arrangement, the local oscillation signal for the frequency conversion is controlled by a feed-back manner to maintain a predetermined frequency. This feed-back control is performed by the PLL circuit by using a reference signal from an external oscillation circuit that is made of such as a highly-accurate crystal oscillator. Further the test signal source is made of a mixer circuit that creates the test signal from the local oscillation signal and the reference signal.

With this arrangement, the test signal source can be realized by the existing structure for creating the local oscillation signal for the frequency conversion, thereby reducing the circuit scale.

Further, the radio-frequency receiving apparatus of an embodiment of the present invention further comprises an amplifier on a signal line for supplying the test signal to the frequency conversion section, the amplifier switching its gain level so that different gains are used in normal operation and in test operation.

With this arrangement, the amplifier amplifies the test signal produced by the test signals source, by using the signal from the built-in oscillation circuit. The amplifier switches its gain level so that the gain level becomes high in the test operation, and becomes low in the normal operation.

With this arrangement, it is possible to carry out the test without influence of leakage of an external radio-frequency signal.

Further, the radio-frequency receiving apparatus of an embodiment of the present invention is arranged so that the signal line for supplying the test signal to the frequency conversion section is cut-off, and is provided with short-circuit pads in cut-off edges, the short-circuit pads being conducted in test operation to open a path for the test signal, and being separated in normal operation to block the path for the test signal.

With this arrangement, the test signal line is cut-off, the short-circuit pads on the cut-off edges are conducted in test operation to open a path for the test signal, and are released from the conduction in normal operation to block the path for the test signal.

With this arrangement, it is possible to carry out the test without influence of leakage of an external radio-frequency signal.

Further, the radio-frequency receiving apparatus of an embodiment of the present invention further comprises an amplifier on a signal line for supplying the input radio-frequency signal to the frequency conversion section, the amplifier switching its gain level so that different gains are used in normal operation and in test operation.

With this arrangement, the amplifier amplifies the externally supplied radio-frequency signal, and switches its gain level so that the gain level becomes low in the test operation, and becomes high in the normal operation.

With this setting, it is possible to carry out the test without influence of leakage of an external radio-frequency signal.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A radio-frequency receiving apparatus, formed as an integrated circuit, for performing frequency conversion with a frequency conversion section upon receipt of an input radio-frequency signal, the frequency conversion section including an oscillation circuit and a phase lock loop circuit, the apparatus comprising,
    a test signal source for producing a radio-frequency test signal; and
    a test signal supply circuit, which is not part of the frequency conversion section, receiving the radio-frequency test signal, wherein:
    the test signal source is a testing mixer circuit that receives a local oscillation signal from the oscillation circuit and a reference signal supplied from an oscillation circuit that is external to the integrated circuit to provide the radio-frequency test signal,
    the local oscillation signal is used for the frequency conversion, and
    the reference signal and the local oscillation signal are also input to the phase lock loop circuit.

2. The radio-frequency receiving apparatus as set forth in claim 1, further comprising:
    a test signal supplying circuit for selectively supplying one of the input radio-frequency signal and the test signal produced by the test signal source to the frequency conversion section, the test signal supplying circuit selecting the input radio-frequency signal in normal operation, and selecting the test signal in test operation.

3. The radio-frequency receiving apparatus as set forth in claim 1, further comprising:
    an amplifier on a signal line for supplying the test signal to the frequency conversion section, the amplifier switching its gain level so that different gains are used in normal operation and in test operation.

4. The radio-frequency receiving apparatus as set forth in claim 1, wherein:
    the signal line for supplying the test signal to the frequency conversion section is cut-off, and is provided with short-circuit pads in cut-off edges, the short-circuit pads being conducted in test operation to open a path for the test signal, and being separated in normal operation to block the path for the test signal.

5. The radio-frequency receiving apparatus as set forth in claim 1, further comprising:
    an amplifier on a signal line for supplying the input radio-frequency signal to the frequency conversion section, the amplifier switching its gain level so that different gains are used in normal operation and in test operation.

6. The radio-frequency receiving apparatus as set forth in claim 1, further comprising:
    a self-diagnosis circuit for judging an output signal of the frequency conversion section where the test signal produced in the test signal source is subjected to frequency conversion.

7. The radio-frequency receiving apparatus as set forth in claim 6, wherein:
    the self-diagnosis circuit includes an AD converter for performing analog/digital conversion with respect to the output signal of the frequency conversion section where the test signal is subjected to frequency conversion and a programmable logic for processing an output signal of the AD converter using a programmable signal processing program.

8. An integrated circuit for performing frequency conversion upon receipt of an input radio-frequency signal comprising:
    a frequency conversion section having an oscillation circuit producing an oscillation signal, and a phase lock loop circuit receiving the oscillation signal from the oscillation circuit;
    a test signal source, which is not part of the frequency conversion section, producing a radio frequency test signal by mixing said oscillation signal from the oscillation circuit with a reference signal from an oscillation circuit external to the integrated circuit, the reference signal and said oscillation signal also being supplied to the phased lock loop circuit; and
    a test signal supply circuit, which is not part of the frequency conversion section, configured to receive the radio-frequency test signal.

9. The integrated circuit of claim 8 including a self-diagnosis circuit for judging an output signal of the frequency conversion section when the test signal is subjected to frequency conversion.

10. A method of testing an integrated circuit for performing frequency conversion upon receipt of an input radio-frequency signal, the integrated circuit including a frequency conversion section having an oscillation circuit producing an oscillation signal and a phase lock loop circuit, comprising the steps of:
    providing a local oscillation signal from the oscillation circuit included in the integrated circuit to the phase lock loop circuit and to a test signal source that is not part of the frequency conversion section;
    providing a reference signal from an oscillation circuit that is external to the integrated circuit to the test signal source and to the phase lock loop circuit;
    mixing the local oscillation signal with the reference signal in the test signal source to output the radio-frequency test signal; and
    supplying the radio-frequency test signal to a test signal supply circuit, which is not part of the frequency conversion section.

11. The method of claim 10 including the additional step of supplying one of the input radio frequency signal and the test signal to the frequency conversion section.

* * * * *